United States Patent
Piret et al.

(10) Patent No.: US 7,267,782 B2
(45) Date of Patent: Sep. 11, 2007

(54) TWO-PART COMBINATION OF COMPOSITIONS FOR FORMING SUBSTANTIALLY COLORLESS THERMOPLASTIC REINFORCEMENTS

(75) Inventors: Willy H. Piret, Xhendelesse (BE); Nadia Masson, Olne (BE)

(73) Assignee: Owens-Corning Fiberglas Technology II, LLC, Toledo, OH (US)

( * ) Notice: Subject to any disclaimer, the term of this patent is extended or adjusted under 35 U.S.C. 154(b) by 384 days.

(21) Appl. No.: 10/464,930

(22) Filed: Jun. 19, 2003

(65) Prior Publication Data
US 2004/0258912 A1 Dec. 23, 2004

(51) Int. Cl.
*D06M 15/55* (2006.01)
*D06M 15/564* (2006.01)
*C03C 17/30* (2006.01)
*C03C 17/32* (2006.01)
*C03C 17/34* (2006.01)

(52) U.S. Cl. .................. 252/8.83; 252/8.81; 65/443; 65/444; 65/447; 65/448; 65/450; 65/451

(58) Field of Classification Search ............... 252/8.81, 252/8.83; 523/400; 525/523, 528
See application file for complete search history.

(56) References Cited

U.S. PATENT DOCUMENTS

| | | | | |
|---|---|---|---|---|
| 2,872,427 A | * | 2/1959 | Schroeder | 523/402 |
| 2,931,739 A | * | 4/1960 | Marzocchi et al. | 428/391 |
| 3,679,507 A | * | 7/1972 | Marzocchi | 156/148 |
| 4,430,158 A | * | 2/1984 | Jackey et al. | 162/156 |
| 4,840,755 A | | 6/1989 | Nakazawa et al. | |
| 5,130,197 A | * | 7/1992 | Temple | 428/378 |
| 5,578,535 A | | 11/1996 | Hill et al. | |
| 5,646,207 A | | 7/1997 | Schell | |
| 5,811,480 A | | 9/1998 | Kirchmeyer et al. | |
| 5,868,982 A | | 2/1999 | Strait et al. | |
| 5,908,689 A | * | 6/1999 | Dana et al. | 428/219 |
| 6,005,026 A | * | 12/1999 | Piret et al. | 523/206 |
| 6,365,090 B1 | | 4/2002 | Strait et al. | |
| 6,365,272 B1 | * | 4/2002 | Masson et al. | 428/378 |

FOREIGN PATENT DOCUMENTS

| | | |
|---|---|---|
| WO | WO99/16720 | 4/1999 |
| WO | WO 01/49627 | 7/2001 |
| WO | WO 03/053875 | 7/2003 |

* cited by examiner

*Primary Examiner*—Michael J. Feely
(74) *Attorney, Agent, or Firm*—Inger H. Eckert; Margaret S. Milliken

(57) ABSTRACT

A two-part sizing composition including a precursor size composition and a binder composition, the binder composition being substantially free of any aminosilane coupling agent for is provided for the production of reinforcing fiber materials that exhibit little or no coloration. The two-part sizing composition may be advantageously employed to make substantially colorless, densified fiber pellets of a reinforcing fiber material. The densified fiber pellets may be produced by applying the sizing composition to reinforcing fiber strands, chopping the reinforcing fiber strands to form chopped strand segments, applying the binder composition, and palletizing and densifying the coated chopped strand segments to form flowable densified fiber pellets.

36 Claims, No Drawings

TWO-PART COMBINATION OF COMPOSITIONS FOR FORMING SUBSTANTIALLY COLORLESS THERMOPLASTIC REINFORCEMENTS

TECHNICAL FIELD AND INDUSTRIAL APPLICABILITY OF THE INVENTION

The present invention relates generally to a sizing composition that reduces discoloration and, more particularly, to a two-part sizing composition that includes a size composition and a binder composition that does not include an aminosilane coupling agent.

BACKGROUND OF THE INVENTION

Chopped glass fiber strands are commonly used as reinforcement materials in thermoplastic articles. It is known in the art that glass fiber reinforced polymer composites possess higher mechanical properties compared to unreinforced polymer composites, provided that the reinforcement fiber surface is suitably modified by size chemical formulation. Thus, better dimensional stability, tensile strength and modulus, flexural strength and modulus, and impact resistance and creep resistance can be achieved with glass fiber reinforced composites.

Typically, the glass fibers are formed by drawing molten glass into filaments through a bushing or orifice plate, applying a sizing composition containing lubricants, coupling agents and film-forming binder resins to the filaments, gathering the filaments into strands, chopping the glass fiber strands into segments of the desired length, and drying the sizing composition. These chopped fiber strand segments are thereafter mixed with a polymeric resin, and the mixture supplied to a compression- or injection-molding machine to be formed into glass fiber reinforced plastic articles. Typically, the chopped fiber strands are mixed with pellets of a thermoplastic polymer resin, and the mixture supplied to an extruder wherein the resin is melted, the integrity of the glass fiber strands is destroyed, the fiber strands are dispersed throughout the molten resin, and the fiber strand/resin dispersion is formed into pellets. These pellets are then fed to the molding machine and formed into molded composite articles having a substantially homogeneous dispersion of the glass fiber strands throughout.

Unfortunately, however, chopped glass fiber strands made via such processes are typically bulky and do not flow well. Consequently, such chopped strands are difficult to handle and have been problematic in automated processing equipment.

One attempt at solving this problem has been to compact the chopped fiber strands into denser rod-shaped bundles or pellets to improve their flowability, and to enable the use of automated equipment to weigh and transport these pellets for mixing with the thermoplastic polymer resins. Such a process is disclosed in U.S. Pat. No. 4,840,755, wherein wet chopped fiber strands are rolled, preferably on a vibrating carrier, to round the strands and compact them into denser, cylindrically shaped pellets. While such methods and apparatus tend to provide denser, more cylindrically shaped pellets exhibiting better flowability, they are undesirably limited in certain respects. For example, in such pellet-forming processes, the pellet size and fiber content are generally limited by the size and number of fibers in the chopped strand, because the process is designed to avoid multiple chopped strand segments from adhering together to form pellets containing more fibers than are present in a single chopped strand. Consequently, to obtain pellets having a suitable bulk density and a sufficient ratio of diameter to length to exhibit good flowability, the fiber strand from which the segments are chopped usually must be formed of a large number of filaments. However, increasing the number of filaments required to be formed and combined into a single strand undesirably complicates the forming operation.

In an attempt to overcome these shortcomings, U.S. Pat. No. 5,578,535, which is herein incorporated by reference in its entirety, discloses glass fiber pellets that are from about 20 to 30 percent denser than the individual glass strands from which they are made, and from about 5 to 15 times larger in diameter. These pellets are prepared by (i) hydrating cut fiber strand segments to a level sufficient to prevent separation of the fiber strand segments into individual filaments but insufficient to cause the fiber strand segments to agglomerate into a clump; and (ii) mixing the hydrated strand segments by a suitable method for a time sufficient to form pellets. Suitable mixing methods include processes that keep the fibers moving over and around one another, such as tumbling, agitating, blending, commingling, stirring and intermingling. Although these pellets can be made by such diverse mixing methods, it has been discovered that many of these methods are either too inefficient to be used commercially, or cannot be adequately controlled to produce sufficiently uniform pellets to provide the composite article made therefrom with the strength characteristics comparable to a composite article made from non-pelleted chopped fiber strands. For example, the use of a modified disk pelletizer frequently results in excessive residence time of the formed pellets within the mixer, which causes the pellets to rub against each other for an excessive period, which in turn results in degradation of the pellets, due to their abrasive nature. Such pellet degradation ultimately reduces the strength characteristics of the molded composite articles.

Another problem commonly known to pellets made from fiber strands that are made for use as reinforcements in composites and other fiber-reinforced products is the discoloration they could cause to the thermoplastic during compounding and/or heat ageing of the molded part. This discoloration is typically seen as an undesirable yellowing of the thermoplastic that is thought to be related to some of the materials used to size the fiber strands, including, but not limited to, the binders and film formers used in the sizing compositions used to treat the fiber strands.

Discoloration in molded composite products, or in the materials used to manufacture molded composite products, may arise from the presence of contaminants in one or more materials that make up the composite formulation, or from the presence of impurities in the ingredients that are used to form fiber-reinforced composites. These ingredients may be materials used in sizing compositions for coating reinforcing fibers before they are molded into composites. For example, conventional sizing compositions often impart a yellow color or other discoloration to the compounds when such sizings are applied. These discolorations may be carried into the composite product when the reinforcements are molded. These discolorations may be caused by oxidatative decomposition of unsaturated chemicals, such as fatty unsaturated surfactants and/or lubricants, which are of low thermal stability. These discolorations may also be caused by nitrogen containing compounds, such as amides, imides, cationic surfactants or amine-based chemicals, which are used, for example, as neutralizing agents.

Historically, the problem of discoloration has been partially addressed by adding ingredients to the composite formulation to counteract the discoloration before the composite formulation is molded. Frequently, antioxidants are used in the compounding formulations to minimize thermal degradation and associated discoloration. Also, the added ingredient may be a colorant, e.g., pigment or dye, that changes the color of the composite formulation. For example, a blue pigment or dye may be added to the composite formulation to combat a yellow discoloration and, as a result, the finished molded composite appears whiter.

A more recently developed method of correcting discoloration has been adapted to fiber-reinforced composite manufacturing. Although it has traditionally been used in compositions applied to paper products, clothing, and plastics to create a brilliant white appearance, the method involves adding an optical brightener, such as a fluorescent whitening or brightening agent, to the composite formulation or to the sizing compositions that are applied to the fiber reinforcements used to mold composites. U.S. Pat. No. 5,646,207, for example, describes a sizing composition that includes a fluorescent whitening agent in addition to other sizing ingredients such as a carboxylated polypropylene, a silane coupling agent, and a lubricant. However, compositions such as those disclosed in this patent rely specifically on the presence of the fluorescent whitening agent to reduce discoloration in the composite product.

Use of an optical brightener does not, however, satisfactorily solve the problem of discoloration of the molded composite. According to U.S. Pat. No. 5,646,207, discoloration problems in the molded composite remain when the fluorescent whitening agent is added to the composite formulation because, in order to prevent discoloration satisfactorily, the fluorescent whitening agent must be well dispersed into the matrix polymer of the composite formulation. At the same time, this patent notes that uniform dispersion of the fluorescent brightener in the matrix resin is difficult to achieve.

Other technical and economic problems stem from the use of optical brighteners such as a fluorescent whitening agent in composite formulations and in particular, in sizing compositions for fiber reinforcements. Technical problems may compromise the quality of the composite matrix polymer or undesirable interactions with other composite ingredients. For example, an optical brightener typically accelerates degradation of the matrix polymer when it is exposed to ultraviolet (UV) light or other forms of radiant energy. Moreover, optical brighteners themselves can degrade chemically over time, and thus contribute to yellowing or other discoloration of the molded composite articles. Another observed problem arises when an optical brightener reacts with other ingredients such as an antioxidant that may be added to the composite formulation. In this regard, combining the optical brightener and the antioxidant reduces the efficiency of both ingredients, and ultimately results in discoloration of the composite.

Additionally, it has been observed that color matching of composite batches is difficult to achieve when the composite contains optical brighteners. In order to compensate for these difficulties in color matching, in some cases varying amounts of pigments or other additives have been added to the composite, further complicating the effort to maintain consistent color between batches. The difficulties encountered in turning out composite batches having consistent color, in turn, increases the cost of production by requiring more starting materials and higher labor costs, and therefore poses an economic disadvantage in addition to the technical problems. Further, color analysis of molded articles that contain optical brighteners is difficult because the articles behave differently under different lighting types and conditions. These problems with color analysis also increase the costs of producing the fiber reinforcements and/or the composite product. The use of optical brighteners further contributes to increased production costs simply because they tend to be relatively expensive chemicals.

In some applications, it may be desired that the molded composite product have a white color. In this regard, whitening pigments have been added directly to the composite molding composition to provide white coloration. One such typically used whitening pigment is powdered titanium dioxide ($TiO_2$). However, the addition of whitening pigments such as $TiO_2$, which may also act as abrasives, tends to result in damage to the reinforcing glass fibers and dramatically reduce the mechanical strength of the composite.

Therefore, there is a need in the art for a cost-effective sizing composition for use in preparing chopped strands and glass fiber pellets which have little or no coloration and provide increased whiteness, brightness, color stability and/or color compatibility in a molded composite product without requiring the use of an optical brightener or whitener.

SUMMARY OF THE INVENTION

An object of the invention is to provide a sizing composition that includes a size composition and a binder composition which does not include an aminosilane coupling agent.

Another object of the invention is to provide a reinforcing fiber product which, when molded, provides a composite that has reduced discoloration. Accordingly, the invention includes a substantially colorless reinforcing fiber product formed from a reinforcing fiber strand coated with the two-part sizing composition. The term substantially colorless as it is used herein means that there is minimal or no coloration of the reinforcing fiber product, and that any minimal coloration is not readily apparent to the naked eye.

The present invention further includes a process for making a densified reinforcing fiber product that includes the steps of:

a) preparing a precursor size comprising one or more coupling agents;

b) applying the precursor size to a strand of reinforcing fibers;

c) chopping the strand of reinforcing fibers to form segments;

d) applying a binder size to the segments to form binder-sized segments; and e) densifying the binder-sized segments to form a densified reinforcing fiber product.

In a continuous process that includes an in-line fiber forming operation, the step of applying the binder size outside of the fiber-forming environment permits the inclusion of materials that are not desirable in the forming process because of toxicity, cleanliness, odor, high cost, or shear sensitivity.

The present invention also includes a molded composite article that is formed of a reinforcing fiber material sized with a size composition and a binder size that does not contain an aminosilane coupling agent.

The foregoing and other objects, features, and advantages of the invention will appear more fully hereinafter from a consideration of the detailed description that follows.

DETAILED DESCRIPTION AND PREFERRED EMBODIMENTS OF THE INVENTION

According to the invention, a two-part size composition that includes a size composition and a binder size can be applied to a reinforcing fiber material to form a reinforcing fiber product. The size composition is applied to the reinforcing fiber strand material before the binder size material is applied. The reinforcing fiber product may then be densified or compacted to form a densified reinforcing fiber product, such as pellets.

Once the reinforcing fibers are formed, and prior to their collection into a strand, they are coated with a size composition. A suitable size composition according to exemplary embodiments of the present invention includes one or more coupling agents, a cationic softener, and a wetting agent. Optionally, the size composition may include conventional additives such as pH adjusters, antioxidants, antifoaming agents, processing aids, lubricants, antistatic agents, and non-ionic surfactants.

Any variety of lubricant are suitable for use in the size composition including, for example, water soluble ethyleneglycol stearates, ethyleneglycol oleates, ethoxylated fatty amines, glycerine, emulsified mineral oil, and organo polysiloxane emulsions. Preferred lubricants include polyethylene glycol monostearate; polyethylene glycol monooleate; butoxyethyl stearate; stearic ethanolamide (LUBESIZE K-12, available from Alpha/Owens Corning ("AOC")); the lubricant compositions disclosed in U.S. Pat. No. 3,597,265, the disclosure of which is incorporated herein, in its entirety, by reference and includes EMERLUBE 6760 (available from Emery Corp.); and a blend of 30% white oil, 30% polyethylene glycol 400 monopelargonate, 30% polyoxyethylene (3) myristic alcohol, and 10% ethoxylated alkyl amine (PARASTAT S-2) (EMERLUBE 7607, available from Emery Corp.). Preferably, the lubricant is present in the size composition in an amount of from about 0.05 percent to about 0.10 percent by weight.

The size composition preferably includes one or more silane coupling agents. Silane coupling agents function to enhance the adhesion of the film forming copolymer to the glass fibers and to reduce the level of fuzz, or broken fiber filaments, during subsequent processing. In addition, silane coupling agents improve adhesion between reinforcing fiber materials and the polymer resin to be reinforced. Silane coupling agents which may be used in the present size composition are characterized by the functional groups amino, epoxy, ester, vinyl, alkyl, methacryloxy, ureido, isocyanato, and siloxane. Preferred silane coupling agents include silanes containing one or more nitrogen atoms that have one or more functional groups selected from amine (primary, secondary, tertiary, and quarternary), amino, imino, amido, imido, ureido, isocyanateo, or azamido.

Suitable silane coupling agents for use in the size composition are available commercially, for example, from OSi Specialities ("OSi"), Middlebury, Conn. or Dow Corning Inc. ("DOW"), Midland, Mich. Examples of suitable silane coupling agents include, but are not limited to aminopropyl-triethoxy-silane, commercially available under the trade name A-1110 from OSi; diamino-silane, commercially available under the trade name A-1120 from OSi; and polyazamide silylated aminosilane, commercially available under the trade name A1387 from OSi. Other useful and commercially available aminosilanes include, but are not limited to, A-1100 (γ-(amino)-propyl-triethoxy-silane) (OSi); PC-1130 (amino-propyl-methyl-dimethoxy-silane) (Power Chemical Products ("PCC"), Nanjing, China); PC1200 (amino-ethyl-amino-propyl-trimethoxy-silane) (PCC); PC1210 (amino-ethyl-amino-propyl-triethoxy-silane) (PCC); PC1220 (amino-ethyl-amino-propyl-methyl-dimethoxy-silane) (PCC); PC1300 (diethylene-triamino-propyl-trimethoxy-silane) (PCC); and PC1600 (cyclohexyl-amino-propyl-trimethoxy-silane) (PCC).

Other suitable coupling agents include organo-functional silanes, such as those commercially available from OSi including, for example, A-154 (methyl-trichloro-silane); A-163 (methyl-trimethoxy-silane); A-189 (γ-mercapto-propyl-trimethoxy-silane); A-143 (γ-chloro-propyl-trimethoxy-silane); A-151 (vinyl-triethoxy-silane); A-172 (vinyl-tris-(2-methoxy-ethoxy)-silane); A-188 (vinyl-triacetoxy silane); A-174 (γ-(methacryloxy)-propyl-triethoxy-silane); and A-187 (γ-glycidoxy-propyl-trimethoxy-silane); and A-1120, n-(trimethoxy-silyl-propyl-ethylene-diamine.

Other suitable coupling agents commercially available from OSi and others include A-1102 (γ-amino-propyl-triethoxy-silane) (OSi); A-1106 (amino-alkyl silicone solution) (OSi); A-1108 (modified amino-organo-silane) (OSi); A-1110 (γ-amino-propyl-trimethoxy-silane) (OSi); A-120(n-β-(amino-ethyl)-γ-amino-propyl-trimethoxy-silane) (OSi); A-1122 (oligomeric β-(amino-ethyl)-γ-amino-propyl-trisilanol) (OSi); A-1126 (a modified amino-organo-silane (40% in methanol)) (OSi); A-1128 (a modified amino-silane (50% in methanol)) (OSi); A-1130 (triaminofunctional silane) (OSi); A-1170 (bis-(γ-trimethoxy-silyl-propyl)-amine) (OSi); A-1387(polyazamide silane (50% in methanol)) (OSi); A-1524 (ureidosilane) (OSi); A-2120 (n-β-(amino-ethyl)-γ-amino-propyl-methyl-dimethoxy-silane) (OSi); A-Link™ 15(n-ethyl-amino-isobutyl-trimethoxy-silane (OSi); DC1-6137 (n-β-(amino-ethyl)-γ-amino-propyl-trimethoxy-silane aqueous solution) (DOW); DYNASYLAN 1172 (50% n-vinyl-benzyl-n-amino-ethyl-3-amino-propyl polysiloxane, hydro acetate) (HULS); HS2776 (alkyl-polysiloxanes, amino-modified (HULS); VS 142 (γ-amino-propyl-triethoxy-silane (aqueous)) (OSi); methacryl-amido functional silane; n-phenyl-γ-amino-propyl-trimethoxy-silane; Z6020 (n-β-(amino-ethyl)-γ-amino-propyl-trimethoxy-silane) (DOW); and Z6026 (a modified aminoorganosilane (40% in methanol)) (DOW).

The size composition may include one or more of the above-identified coupling agents. Preferably, the coupling agent is present in the size composition in an amount of from 48-99% by weight of total solids in the size composition, and even more preferably in an amount of from 80-95% by weight of the total solids in the size composition. As will be appreciated by those of skill in the art, the coupling agent or agents may be included in the size composition as prepared or received, or may be pre-hydrolyzed or otherwise modified to form, for example, a salt or other derivative composition, before being combined with the other components of the size composition.

A second component of the size composition is one or more cationic softeners. Cationic softeners function as a surface active agent and have the ability to adsorb strongly on negatively charged surfaces, such as glass or metals. Suitable examples of cationic softeners for use in the size composition include imidazoline and alkyl imidazoline derivatives commercially available as CATIONIC SOFTENER CONC. FLAKES (about 90% solids) from Th. Goldschmidt AG (Essen, Germany) and the amino ethyl imidazolines IMIDAZOLINE 18NH and IMIDAZOLINE 18CA commercially available from Lakeland Laboratories, Ltd. (Manchester, UK) (based on a 1:1 mixture of Tall Oil ($C_{17}$ alkyl chain) and diethylene triamine). Other suitable cationic softeners are easily identified by one of skill in the art. A preferred cationic softener is the acetic acid salt of the reaction product of tetraethylene pentamine and stearic acid converted in about 91% imidazoline groups as LUBESIZE K-12 by Alpha/Owens Corning (Ontario, Canada).

Imidazolines are thermally stable organic nitrogenous bases. Unneutralized imidazolines, being lipophilic, are generally soluble in non-polar solvents and mineral oil but tend to only be dispersible in aqueous systems. The ability of imidazolines to form cations renders them strongly adsorbed onto the negatively charged surface of metals, fibers, plastics, glass and minerals, thereby converting these hydrophilic surfaces to hydrophobic surfaces. Imidazoline salts tend to be much more hydrophilic than their bases and function as acid stable detergents with good wetting agents. The compatibility of imidazolines in aqueous systems may be improved through the use of suitable solubilizers.

A third component of the size composition is one or more wetting agents. Suitable wetting agents are generally those wetting agents that are able to reduce the surface tension of the size composition less than about 35 dyne/$cm^2$ to facilitate the wetting of a glass fiber. Although any type of wetting agent may be used in the sizing composition, non-ionic wetting agents are typically preferred to reduce interaction with other size composition components. A particularly suitable wetting agent is a fluoroalkyl alcohol substituted polyethylene glycol sold under the trade name of ZONYL FS-300 by Dupont, Wilmington, Del.

Optionally, one or more conventional antistatic agents may be included in the size composition in an amount sufficient to reduce the generation of static electricity between the glass fibers. In some instances, other components of the size composition such as the cationic softener may also convey certain antistatic properties to the composition.

Although the pH of the size composition of the present invention may be adjusted within a relatively range depending on the particular application and remain effective, it is preferred that the size composition be neutral to basic. In particular, it is preferred that the size composition generally fall within a pH range of between about 7 and 11. However the pH of the size composition may be adjusted to facilitate the compatibility of the precursor size ingredients through the addition of one or more pH adjusters. For example, small amounts of a weak acid, such as acetic acid, may be added to the precursor size to adjust the pH.

The size composition may be made by dissolving each of the ingredients into a premix with agitation, then combining the separate premixes with deionized water to form a main mixture and to achieve the appropriate concentration and control the mix of solids. The premixes can be added separately or at the same time to the main mixture.

The one or more coupling agents and the cationic softener are included in the size composition in a weight ratio of about 1:1 to about 30:1, based on dry actives weight; and the one or more coupling agents and the wetting agent are included in the size composition in a weight ratio of about 4:1 to about 60:1, based on dry actives weight.

As described above, the two-part sizing composition also includes a binder composition that does not include an aminosilane coupling agent. The binder composition includes a non-ionic aqueous emulsion of an epoxy-ester resin, a non-ionic aqueous emulsion that includes a flexible epoxy resin or, more typically, a non-ionic aqueous emulsion including both epoxy ester resin and flexible epoxy resin. The binder composition will also typically include a minor portion of an aqueous polyurethane dispersion to improve the manufacturability of the composition. The relative portions of the epoxy resin emulsions and the polyurethane dispersion may vary within a wide range depending on the desired properties and processing considerations. Optionally, the binder composition may include one or more conventional additives known to those of skill in the art, such as, for example, adhesive film-forming polymers, lubricants, surfactants or a mixture of surfactants, and crosslinking agents such as polyacids, polyamines, and polyfunctional blocked isocyanates to adapt the binder composition for a particular process or use.

Examples of the non-ionic water emulsion of an epoxy-ester resin include, but are not limited to, multi-functional epoxy resins such as bisphenol-A based epoxy resins, bisphenol-F based epoxy resins and novolac based epoxy resins. The non-ionic aqueous epoxy-ester resin emulsion may be present in the binder composition in an amount of up to about 90% by weight of the binder composition, preferably not more than about 51% by weight of the binder composition.

Alternatively, any other non-ionic emulsion of epoxy-ester resin or epoxy resin having the same weight of the solid material can be used. Examples of materials that may further reduce coloration and improve mechanical performances include epoxy emulsions such as EM-051R (a non-ionic multifunctional epoxy resin emulsion), EM-54R5 (a non-ionic multifunctional epoxy emulsion), EM-517 (an non-ionic bisphenol A novolac type epoxy resin emulsion), and EM-514 (a non-ionic phenol novolac epoxy emulsion), each available from Asahi Denka ("Asahi") (Tokyo, Japan); NEOXIL 962D and NEOXIL 961D (non-ionic epoxy-ester emulsions) and NEOXIL 8294 (a non-ionic epoxy emulsion) available from DSM.

Other suitable epoxy dispersions include EPI-REZ Resin 3510-W-60, an aqueous dispersion of a low molecular weight liquid Bisphenol A epoxy resin (EPON™ Resin 828-type); EPI-REZ Resin 3515-W-60, an aqueous dispersion of a semi-solid Bisphenol A epoxy resin; EPI-REZ Resin 3519-W-50, an aqueous dispersion of a CTBN (butadiene-acrylonitrile) modified epoxy resin; EPI-REZ Resin 3520-WY-55, an aqueous dispersion of a semi-solid Bisphenol A epoxy resin (EPON 1001-type) with an organic co-solvent; EPI-REZ Resin 3521-WY-53, a lower viscosity version of the EPI-REZ Resin 3520-WY-55 dispersion; EPI-REZ Resin 3522-W-60, an aqueous dispersion of a solid Bisphenol A epoxy resin (EPON 1002-type); EPI-REZ Resin 3535-WY-50; an aqueous dispersion of a solid Bisphenol A epoxy resin (EPON 1004-type) with an organic co-solvent; EPT-REZ Resin 3540-WY-55, an aqueous dispersion of a solid Bisphenol A epoxy resin (EPON 1007-type) with an organic co-solvent; EPI-REZ Resin 3546-WH-53, an aqueous dispersion of a solid Bisphenol A epoxy resin (EPON 1007-type) with a non HAPS co-solvent; EPI-REZ Resin 5003-W-55, an aqueous dispersion of an epoxidized Bisphenol A novolac resin with an average functionality of 3 (EPON SU-3 type); EPI-REZ Resin 5520-W-60, an aqueous dispersion of a urethane-modified Bisphenol A epoxy resin; EPI-REZ Resin 5522-WY-55, an aqueous dispersion of a modified Bisphenol A epoxy resin (EPON 1002-type) with an organic co-solvent; EPI-REZ Resin 6006-W-70, an aqueous dispersion of a epoxidized o-cresylic novolac resin with an average functionality of 6, each of which is commercially available from Resolution Performance Products.

The binder composition may comprise a mixture of 1-methoxy-2-propanol bisphenol A epoxy resin having a Mn of less than about 700 and 1-methoxy-2-propanol epoxy resin having a Mn of about 3200.

The binder composition will also typically include a polyurethane dispersion. Suitable polyurethane dispersions include BAYBOND VP LS2277 available from Bayer (Leverkusen, Germany); AQUATHANE 518 (a non-ionic polyurethane dispersion based on polyester polyol and aliphatic isocyanate), AQUATHANE 1940NE (a polyether based aliphatic polyurethane non-ionic/anionic dispersion), AQUATHANE 2250 (a polyester base, aliphatic isocyanate, non-ionic/anionic formulation), and AQUATHANE HS1670 (a polyester base, aliphatic isocyanate non-ionic/anionic dispersion), each available from Dainippon, Inc.; and WITCOBOND 290H, which is commercially available from Witco.

The epoxy-ester resin and/or the flexible epoxy resin, and the polyurethane are included in the binder composition in a weight ratio of about 5:1 to about 20:1, based on dry actives weight.

A lubricant may also be included in the binder composition. Suitable lubricants include, for example, polyoxy-alkylene-amines, such as those available from Huntsman Corporation (Zaventem, Belgium). Specific examples of such polyoxy-alkylene-amines are JEFFAMINE ED2003 (oxirane, methyl-polymer with oxirane and bis-(2-amino-propyl)-ether); EDR-148 (triethylene-glycol-diamine); D230 (poly-(oxy-(methyl-1,2-ethanediyl)), α-(2-amino-methyl-ethyl)-ω-(2-amino-methyl-ethoxy)-; XTJ-511 (alkyl ether amine); D400 (polyoxy-propylene-diamine); ED-900 (oxirane, methyl-, polymer with oxirane and bis-(2-amino-propyl)-ether); ED-600 (oxirane, methyl-, polymer with oxirane and bis-(2-amino-propyl)-ether); T403 (poly-(oxy-(methyl-1,2-ethanediyl)),-hydro-(2-amino-methyl-ethoxy)-ether with 2-ethyl-2-(hydroxyl-methyl)-1,3-propanediol (3:1)), each of which is commercially available from Huntsman. If present in the binder composition, the lubricant(s) may comprise up to about 10% by weight of the total solids in the binder composition with the preferred amount being not more than about 6% by weight.

A surfactant or surfactant mixture may also be added to the binder composition. Examples of suitable surfactants include, for example, non-ionic surfactants such as TRITON X100 (an octylphenol ethoxylate with an average of 9-10 moles of ethylene oxide, 100% active material), available commercially from Union Carbide Corp. Other suitable surfactants include, for example, PLURONIC PE/F77 (an ethylene oxide/propylene oxide block copolymer) and PLURONIC 10R5 (a tri-block polymer of polypropylene oxide—polyethylene oxide—propylene oxide with secondary hydroxyl end groups), each of which is available commercially from BASF, SYNPERONIC PE/P103 (an ethylene oxide/propylene oxide block copolymer) and SYNPERONIC PE/L101 (a block copolymer of ethylene oxide and propylene oxide), each of which is commercially available from I.C.I. The surfactant or surfactant mixture may be present in the binder composition in an amount of up to about 10% by weight of the total solids in the binder composition, and preferably will account for up to about 1% of the total weight of the binder composition.

A suitable antistatic agent may also be included in the binder composition in an amount sufficient to reduce the generation of static electricity between filaments of reinforcing fiber material coated with the binder composition. Examples of suitable antistatic agents include polyoxy-alkylene-amine, sold under the trade name JEFFAMINE ED2003 by Huntsman Corporation, polyacrylic acid salts, and polyamine salts. Antistatic agents may be present in an amount of up to about 6% by weight of the total solids in the binder composition.

Other additives may be used to modify other properties of the composition. Such additives include, for example, conventional non-ionic emulsions of waxes that may be added both to ease the flow of the melted thermoplastic in complex molds and to serve as a release agent like Carnauba wax, EBS (ethylene bis-stearamide), polyolefin waxes and other functionalized waxes. One additive that has proven suitable for use in the binder composition is MICHEM™ LUBE 156F.E., a non-ionic emulsion of a Carnauba wax available commercially from Michelman, Inc., Cincinnati, Ohio.

The polyurethane dispersion further comprises 5-chloro-2-methyl-3(2H)-isothiazolone and 2-methyl-3(2H)-isothiazolone.

The binder composition may be formed by premixing the non-ionic water emulsion of an epoxy-ester resin. This premix may then be added to a main tank, where the non-ionic water emulsion of a flexible epoxy resin is added with stirring. The polyurethane dispersion may then be added to the main tank to form the final mixture. The final mixture may then be agitated for a period of time suitable to evenly disperse the components in the final mixture. For example, the final mixture may be agitated for a period of from 10-60 minutes, preferably approximately 15 minutes.

The two-part size composition may be used to form a glass reinforced composite that is substantially colorless. Discoloration of the composite generally takes place during compounding in an extruder and injection machine due to the presence of aminosilanes. For example, aminosilanes have been found to be the first cause of discoloration of the polybutylene terephthalate (PBT), polyethylene terephthalate (PET), liquid crystal polyester (LCP) and polycarbonate (PC) compounds during compounding and heat aging. However, the two-part sizing composition contains aminosilanes only in the size composition at a fixed level independent from the quantity of binder composition applied. As a result, the aminosilanes are formed in a first layer to achieve high mechanical properties. Because there is no aminosilane present in the binder composition, a minimal amount of aminosilane is placed on the glass fibers.

One advantage of the two-part sizing composition is that the product resulting from the application of the two-part sizing composition can be run from 0.8% to up to 1.4% Loss On Ignition (LOI) while maintaining a substantially colorless composite. Additionally, the quantity the epoxy on the fiber can be increased and still maintain its ability to disperse in the matrix. The increased epoxy can work as a chain extender for the matrix during compounding, thereby resulting in an increased viscosity and molecular weight as well as improved thermoplastic composite mechanical properties reflected in tests such as tensile strength, flexural strength, Izod impact, Charpy impact and Notched Izod impact. The binder composition can be applied with high efficiency, which reduces waste water contamination in the plant. Further, because the binder composition can be applied with both high effectiveness and high efficiency, the binder application may be achieved at a reduced cost while maintaining performance. In addition, the binder composition efficiency permits higher LOI and better fiber integrity.

The size composition and the binder composition facilitate treating reinforcing fiber materials, for example glass, during a continuous process that includes forming the fibers as well as subsequent processing or handling. Using the precursor size and the binder size of the invention allows the fibers to be treated, directly after forming, with sizing components that could not otherwise normally be included in the fiber-forming process. Moreover, while the invention is highly suitable for in-line manufacturing processes, it may also be used in an off-line process in which the precursor size and binder size are applied to previously formed and packaged reinforcing fiber materials, or in which the precursor size and the binder size are applied to the reinforcing fiber material at different times. For example, the size composition may be applied to a formed fiber strand, after which the strand may be wound and stored before subsequent unwinding, chopping into segments and application of the binder composition.

The size composition and the binder composition are typically used to treat a reinforcing fiber material such as a strand, thread or roving. The reinforcing fiber material is generally one or more strands of a substantially continuous reinforcing fiber material that may be formed by conventional techniques. For example, the reinforcing fiber material may be glass that is formed by drawing molten glass through a heated bushing to form a multitude of substantially continuous glass fibers and collecting the fibers into a strand. Alternatively, the reinforcing fiber material may be strands of one or more polymers made by conventional processes. Such polymers include, for example, polyamide or aramid, which can be used to form reinforcing fiber strands alone or in combination with glass fibers. Carbon or other suitable natural fibers may also be used. Preferably, the reinforcing fiber material for use in the invention includes fibers having a diameter of from about 3 microns to about 90 microns, while typical strands to be cut into segments include from about 50 fibers to about 2000 fibers. The strands may be formed to include from about 400 fibers to about 800 fibers having a diameter of from about 3 microns to about 23 microns. Any suitable apparatus for producing such fibers and collecting them into strands may be used to form the fibers used in the present invention.

Preferably, the process of making a densified reinforcing fiber product is a modified in-line process that permits the continuous sizing, chopping, secondary coating and pelletizing of continuously forming fiber strands, as the reinforcing fiber material, using a two-part combination of a precursor size and binder size. Such a process provides a pellet product that, when integrated into a composite, exhibits better properties than pellets produced by the conventional in-line processes known to those of skill in the art. Such an improvement is thought to be due to the improved compatibility of the components of the two sizes, which allows better coating of the fibers.

The process for making a densified reinforcing fiber product according to the invention may utilize an apparatus that includes: (a) means for applying a first or precursor size to a continuous fiber material; (b) means for cutting the glass fiber strands to form chopped strand segments; (c) means for conveying the chopped strand segments to a first tumbling means; (d) means for applying a second or binder size to the chopped strand segments; (e) a first tumbling means for imparting a tumbling action to the chopped strand segments to disperse the binder size and cause the chopped strand segments to align and coalesce into pellets; (f) optionally, means for conveying the pellets to a second tumbling means; (g) optionally, a second tumbling means for tumbling the pellets to compact them and increase their density; (h) means for conveying the densified pellets to a dryer; and (i) a drying means adapted to receive and dry the pellets.

Initially, the size composition may be applied to the reinforcing fiber material by any conventional means, including kiss roll, dip-draw, slide or spray applicators. Preferably, the precursor size is applied by passing the reinforcing fiber material, for example, strands of glass or polymer, over a kiss roll applicator. Moreover, the size composition is preferably applied to the strands in an amount sufficient to provide the strands with a moisture content of from about 11-17 percent by weight, more preferably about 11-15% by weight (unless indicated otherwise, all percentages hereinafter are by weight).

Thereafter, the sized strands are chopped into strand segments. Preferably, the strand segments have a length between about ⅛ inch (3.175 mm) to about 1¼ inch (31.75 mm). Any suitable means known in the art for chopping glass fiber strands into such segments can be used.

The binder composition may then be applied to the chopped strand segments, which are then pelletized by any suitable method known to one of ordinary skill in the art, for example, tumbling or otherwise agitating the chopped strand segments in a pelletizer. A suitable process of pelletizing the chopped strand segments is disclosed in U.S. Pat. No. 5,868,982, which is herein incorporated by reference in its entirety. During this pelletizing process, the presence of the cross-linker and the film former in the binder composition facilitates adhesion between the strand segments. Further, the amount of moisture in the binder composition serves to adjust the moisture content of the strand segments to a level suitable for the formation of pellets when the strand segments are tumbled in the pelletizer. While the moisture content of the strand segments can be adjusted prior to their introduction into the pelletizer, it is preferred that the segments are hydrated to a moisture content suitable for pellet formation in the pelletizer itself.

Preferably, the moisture content of the strand segments in the pelletizer is from about 12-17 percent by weight, more preferably from about 14-16 percent by weight, based on the total weight of the binder-sized wet glass chopped strand segments. If the moisture content is too low, the strand segments will tend not to combine into pellets and will remain in a typical strand formation. Conversely, if the moisture content is too high, the strands tend to agglomerate or clump or form pellets of having too large a diameter and tending to exhibit irregular and non-cylindrical pellet shapes.

The binder composition may be applied to the chopped strand segments as they enter the pelletizer, or after the chopped segments are placed in the pelletizer but before they are tumbled. In an alternative embodiment, the binder composition may be sprayed onto the strands before they are chopped. In this alternative embodiment, it is preferable to use a pelletizer that is specially equipped with tumbling means such as baffles, to ensure adequate tumbling and forming of the pellets.

The pelletizer used in the present invention can be any apparatus capable of tumbling the strand segments in such a way that: (1) they become substantially uniformly coated with the binder size, and (2) multiple chopped strand segments align and coalesce into pellets of the desired dimensions. Such a tumbling apparatus should have an average residence time sufficient to insure that the strand segments become substantially coated with the binder size and form pellets, but insufficient for the pellets to be damaged or degraded through abrasion by rubbing against one another. Preferably, the residence time in the tumbling apparatus is from about 1-10 minutes. More preferably, the residence time in the tumbling apparatus is from about 1-3 minutes.

A preferred pelletizer is a rotating drum, such as that disclosed in U.S. Pat. No. 5,868,982, as referenced herein above. This patent discloses an apparatus for making reinforcing fiber pellets, which is preferably provided with a system for monitoring and/or adjusting various process parameters. The moisture content of the strand segment input may be monitored and controlled using suitable means. In an embodiment in which the binder size is applied to the strand segments before they are placed in the pelletizer, the rotating drum is adapted to accommodate a spray head for applying the binder size to the strand segments as they enter the drum. The binder size and a solvent, such as water, are combined into one fluid stream that is dispersed through the nozzle orifice. This stream is combined with two jets of air positioned approximately 180 degrees apart and at an angle of about 60 degrees to the direction of the stream flow. This mixing of the binder composition with the forced air streams effectively creates a mist that is propelled onto the surface of the tumbling strand segments in the drum. Rotation of the drum causes the wet strand segments to tumble around one another while the surface tension created by the wet sizing or coating causes strand segments contacting one another over a substantial portion of their length to align with one another and coalesce into a cylindrically shaped pellet. By such action, any fines or single fibers created during the chopping operation are recombined with and incorporated into the forming pellets to essentially eliminate individual fine fibers from the resulting pellets. Preferably, the drum is tilted slightly so that the end of the drum from which the pellets exit is lower than the end in which they enter to ensure that the pellets formed in the drum do not remain in the drum for an excessive period of time.

The size of the pellets formed in the drum is controlled primarily by the moisture content of the strand segments. If the moisture content is maintained at a high level, a greater number of strand segments will coalesce into a pellet and the pellet will thus be of larger diameter. Conversely, if the moisture is maintained at a lower level, fewer strand segments will coalesce into a pellet and the pellet will thus have a smaller diameter. Typically, the amount of binder size that is discharged onto the strands is controlled by a computer which monitors the weight of wet glass entering the pelletizer, and adjusts the amount of size to obtain a final chopped strand having a strand solids content of from about 0.2-2.0% by weight, preferably from about 0.4-1.4% by weight.

Preferably the pellets formed by the process of the invention have a diameter of from about 20% to about 65% of their length. Such pellets are typically formed by combining between about 70-175 strand segments, each strand segment typically containing from about 500-2000 individual filaments per strand.

The size of the pellets is also affected by the drum throughput. If the drum throughput is high, the strand segments have a shorter average residence time in the drum, which tends to result in the formation of smaller pellets. It is believed that this result is observed because the fluid application does not disperse as thoroughly on the strands, thereby reducing the ability of the strands to coalesce into pellets. However, because the pellets that are formed are in the drum for a shorter period of time, less compaction of and damage to the pellets will tend to be achieved.

Although some compaction of the formed pellets invariably occurs in the pelletizer, it is typically insufficient to increase the pellet density to a level providing optimum flowability. For this reason, after their formation in the pelletizer, the pellets may optionally be fed into a second tumbling means or densifier, wherein the pellets are further compacted and densified. Any low-impact tumbling apparatus that will compact the pellets without significantly degrading them through abrasion or otherwise damaging the pellets can be used. A preferred densifier is a zig-zag tube adapted to be rotated about its longitudinal axis, as is described in U.S. Pat. No. 6,365,090 B1, which is herein incorporated by reference in its entirety. Preferably, the densifier has a gentler, less vigorous tumbling action than that of the pelletizer to minimize such degradation of the pellets. As the zig-zag tube is rotated, pellets placed therein are gently tumbled about by the tube's rotation as they are pulled through the tube by gravity. As with the rotating drum described above, the zig-zag tube densifier is preferably tilted at a slight angle to ensure that the pellets flow through the apparatus without excessive residence times. Furthermore, the densifier preferably has an average residence time of less than about 5 minutes, to ensure that the pellets are not degraded through abrasion. More preferably, the average residence time in the densifier is about 1-2 minutes.

Although pellet formation and densification may occur in separate apparatuses, such as a separate rotary drum and a rotating zig-zag tube linked by a conveyor, the process of the present invention may be accomplished using other suitable means. For example, pellet formation and densification may occur in separate tumbling regions or zones within a single apparatus. A preferred example of such an apparatus is a "ZIG-ZAG" blender commercially available from Patterson Kelly. In a preferred embodiment of this device, a drum is equipped with an interior baffle to reduce the free-fall distance of the glass pellets and strand segments during rotation of the drum. By reducing this distance, less deterioration of the glass fibers and pellets through impact and abrasion occurs, resulting in improved physical properties in the glass fiber reinforced molded articles manufactured therefrom. The baffles may take many forms, however particularly preferred configurations include cylindrical and curved plate baffles. Inclusion of the baffles in the drum of the pelletizer used in this invention has been found to reduce the average residence time of the pellets in the drum from about 2 minutes and 35 seconds without a baffle, to about 1 minute and 40 seconds for the generally cylindrical baffle and 1 minute and 20 seconds for the curved plate baffle. Further, the apparent reduction in fiber degradation resulting from the inclusion of such baffles is evident from an increase in the physical properties of articles molded from the resulting pellets, including average increases in tensile strength of about 2-3%, increases in flexural strength of about 1-2% and increases in impact strength of about 4-5 percent.

After densification, the pellets may be delivered onto a conveyor belt and dried, e.g., using a hooded oven supplied with hot air and cooling air or any other suitable drying means. In order to reduce drying time to a level acceptable for commercial mass production, it is preferred that the fibers are dried at elevated temperatures of from about 250° F. (121.1° C.) to about 560° F. (293.3° C.) in a fluidized-bed oven. After drying, the densified pellets may be classified by size using a screen or other suitable device.

By varying the throughput and moisture content of the strand segments, glass fiber pellets can be made that are from about 13-60% more dense than the corresponding unpelleted strand segments, and from about 10-65 times larger in diameter. For example, chopped 4 mm (length) segments of a 2000-filament strand composed of 14-micron (diameter) fibers typically have a bulk density of from about 33 lb/ft$^3$ (528.66 kg/m$^3$) to 36 lb/ft$^3$ (576.72 kg/m$^3$). After being hydrated to a moisture content of from about 13-14 percent and formed into densified pellets according to the process of the invention, the resulting dried pellets typically have a bulk density of from about 40 lb/ft³ (640.8 kg/M³) to about 55 lb/ft³ (881.1 kg/m³). As a result of their increased diameter-to-length ratio and increased density, the resulting pellets exhibit significantly improved flowability in comparison to the unpelleted chopped strand product.

Having generally described this invention, a further understanding can be obtained by reference to certain specific examples illustrated below which are provided for purposes of illustration only and are not intended to be all inclusive or limiting unless otherwise specified.

EXAMPLES

Example 1

Size Composition

The size composition components according to an exemplary embodiment of the present invention are set forth in Table 1.

TABLE 1

| Material | % Active Solids[a] | Kg/1000 liters as received[b] |
| --- | --- | --- |
| A-1100[c] | 52.000 | 10.800 |
| K-12[d] | 88.888 | 0.500 |
| ZONYL FS-300[e] | 40.000 | 0.350 |

[a]% Active Solids used to calculate predicted size mix solids.
[b]As received, mix solids are calculated at 0.62%.
[c]A-1100 is an amino-propyl-triethoxy-silane coupling agent.
[d]K-12 is a cationic softener comprising an acetic acid salt of the reaction product of ethylene pentamine and stearic acid.
[e]Zonyl FS-300 is a fluoroalkyl alcohol substituted polyethylene glycol wetting agent.

10.8 kg of A-1100 was added to 300 liters of demineralized water (approximately 23° C.) in a tank with agitation for approximately 5 minutes to form a coupling agent premix. The coupling agent premix was then added to a main tank. Next, 0.350 kg of ZONYL FS-300 was added to 120 liters of demineralized water in a tank with agitation for a period of approximately 5 minutes to form a wetting agent premix. The tank may be the same tank used to mix the coupling agent premix if it is thoroughly cleaned prior to preparing the wetting agent premix. The wetting agent premix was added to the main tank containing the coupling agent premix. 5.00 kg of a previously 10% pre-diluted K-12 solution was then added to 100 liters of demineralized water in a tank to form a cationic softener premix. The tank may be the same tank used to mix the wetting agent premix and/or the wetting agent premix if the tank is first cleaned. The cationic softener premix was then added to the main tank containing the coupling agent premix and the wetting agent premix.

The main tank containing the combination of the coupling agent premix, the wetting agent premix and the cationic softener premix was then agitated for a period of approximately 15 minutes. The final mix size composition properties are set forth in Table 2.

TABLE 2

| Property | Minimum | Average | Maximum |
| --- | --- | --- | --- |
| Mix Solids % | N/A | 0.62 | N/A |
| PH | 9.5 | 10.0 | N/A |

TABLE 2-continued

| Property | Minimum | Average | Maximum |
| --- | --- | --- | --- |
| Storage Temperature | 20° C. | 23° C. | 26° C. |
| Forming Temperature | 23° C. | 28° C. | 33° C. |
| Shelf Life | N/A | N/A | 96 hours |

Example 2

Binder Composition

The binder composition components according to an exemplary embodiment of the present invention are set forth in Table 3.

TABLE 3

| Material | % Active Solids (approximate) | Kg/1000 liters as received |
| --- | --- | --- |
| NEOXIL 962D[a] | 40% | 446.220 |
| NEOXIL 8294[b] | 55% | 324.620 |
| VP LS 2277[c] | 40% | 105.956 |

[a]Neoxil 962D is a non-ionic aqueous emulsion of an epoxy-ester resin.
[b]Neoxil 8294 is a non-ionic aqueous emulsion of a flexible epoxy resin.
[c]VP LS 2277 is an aqueous polyurethane dispersion.

446.220 kg of NEOXIL 962D was added to a main mix tank and stirred for 5 minutes. 324.62 kg of NEOXIL 8294 was added to the main mix tank containing the 446.220 kg of NEOXIL 962D with continuous stirring. Once all of the NEOXIL 8294 was added, the resultant mixture was stirred for approximately 5 minutes. Next, 105.956 kg of VP LS 2277 was added to the mixture in the main mix tank to form the binder composition. The binder composition was then agitated for approximately 15 minutes and the mix solids content was measured. The properties of the binder composition according to this example are reproduced below in Table 4.

TABLE 4

| Property | Minimum | Average | Maximum |
| --- | --- | --- | --- |
| Mix Solids % | N/A | 39.9 | N/A |
| PH | N/A | 8 | N/A |
| Storage Temperature | 20° C. | 23° C. | 26° C. |
| Viscosity (cps) | N/A | 75 | N/A |
| Particle size (μm) | | | |
| d(v, 0.5) | N/A | 0.5 | N/A |
| d(v, 0.9) | N/A | 1.4 | N/A |

Additional exemplary embodiments of size compositions and binder compositions suitable for use in the two-part sizing composition according to the invention are forth below in Tables 5-13, with Tables 5-9 providing further exemplary binder composition formulations and Tables 10-13 providing further exemplary size formulations.

TABLE 5

| Material | % Active Solids (approximate) | Kg/1000 liters as received |
| --- | --- | --- |
| EM51R | 50% | 334.110 |
| ED2003 | 100% | 20.620 |

TABLE 5-continued

| Material | % Active Solids (approximate) | Kg/1000 liters as received |
|---|---|---|
| EM514 | 55% | 334.110 |
| VP LS 2277 | 40% | 99.130 |

Providing a mix solids percent of about 41.1%.

TABLE 6

| Material | % Active Solids (approximate) | Kg/1000 liters as received |
|---|---|---|
| EM517 | 50% | 714.000 |
| VP LS 2277 | 40% | 105.956 |

Providing a mix solids percent of about 39.9%.

TABLE 7

| Material | % Active Solids (approximate) | Kg/1000 liters as received |
|---|---|---|
| NEOXIL 962D | 40% | 297.480 |
| NEOXIL 8294 | 55% | 432.700 |
| VP LS 2277 | 40% | 211.900 |

Providing a mix solids percent of about 44.2%.

TABLE 8

| Material | % Active Solids (approximate) | Kg/1000 liters as received |
|---|---|---|
| NEOXIL 962D | 40% | 446.220 |
| NEOXIL 8294 | 55% | 324.620 |
| VP LS 2277 | 40% | 105.956 |
| ML156FE | 25% | 226.620 |

Providing a mix solids percent of about 45.6%.

TABLE 9

| Material | % Active Solids (approximate) | Kg/1000 liters as received |
|---|---|---|
| EM54R5 | 50% | 714.00 |
| VPLS 2277 | 40% | 105.956 |

Providing a mix solids percent of about 39.9%

TABLE 10

| Material | % Active Solids | Kg/1000 liters as received |
|---|---|---|
| A-1100 | 52.000 | 5.573 |
| K-12 | 88.888 | 1.240 |
| ZONYL FS-300 | 40.000 | 1.000 |
| PLURONIC 10R5 | 100 | 2.493 |

Providing a mix solids percent of about 0.69% with acetic acid added to adjust the pH to 8.4.

TABLE 11

| Material | % Active Solids | Kg/1000 liters as received |
|---|---|---|
| A-1100 | 52.000 | 4.073 |
| K-12 | 88.888 | 0.100 |
| PLURONIC 10R5 | 100 | 2.000 |

Providing a mix solids percentage of about 0.42% and a pH of about 9.8.

TABLE 12

| Material | % Active Solids | Kg/1000 liters as received |
|---|---|---|
| A-1100 | 52.000 | 4.473 |
| K-12 | 88.888 | 1.000 |
| PLURONIC 10R5 | 100 | 2.000 |

Providing a mix solids percentage of about 0.52% with acetic acid added to obtain a pH of about 8.4.

TABLE 13

| Material | % Active Solids | Kg/1000 liters as received |
|---|---|---|
| A-1100 | 52.000 | 4.073 |
| K-12 | 88.888 | 2.000 |
| ZONYL FS-300 | 40.000 | 1.000 |

Providing a mix solids percentage of about 0.43% with a pH of 9.5.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A two-part combination of compositions for forming a substantially colorless reinforced fiber material comprising:
   a size composition; and
   a binder composition, said binder composition being essentially free of aminosilane coupling agents and comprising one or more members selected from the group consisting of a non-ionic aqueous emulsion of an epoxy-ester resin and a non-ionic aqueous emulsion of a flexible epoxy resin; said binder composition further comprises an aqueous polyurethane dispersion;
   said size composition and said binder composition being chemically distinct from one another; wherein said size composition is applied as a first layer on a glass fiber, forming a sized glass fiber; and said binder composition is applied to said sized glass fiber, forming a substantially colorless reinforced fiber material.

2. The two-part combination of compositions of claim 1, wherein:
   the non-ionic aqueous emulsion of an epoxy-ester resin includes bisphenol A based epoxy resins.

3. The two-part combination of compositions of claim 1, wherein:
   the binder composition comprises a mixture of 1-methoxy-2-propanol bisphenol A epoxy resin having a Mn of less than about 700 and 1-methoxy-2-propanol epoxy resin having a Mn of about 3200.

4. The two-part combination of compositions of claim 1, wherein:
the epoxy-ester resin and the flexible epoxy resin selected from the group consisting of non-ionic multifunctional epoxy resins, non-ionic bisphenol A novolac type epoxy resins, non-ionic phenol novolac epoxy resins; non-ionic epoxy-esters; low molecular weight liquid bisphenol A epoxy resin, semi-solid bisphenol A epoxy resins, butadiene-acrylonitrile modified epoxy resins, semi-solid bisphenol A epoxy resins with an organic co-solvent, solid bisphenol A epoxy resins, solid bisphenol A epoxy resin with an organic co-solvent, solid bisphenol A epoxy resins with a non HAPS co-solvent, epoxidized bisphenol A novolac resins; urethane-modified bisphenol A epoxy resins, and epoxidized o-cresylic novolac resins.

5. The two-part combination of compositions of claim 1, wherein:
the polyurethane dispersion is formed with a polyurethane selected from the group consisting of non-ionic polyurethanes based on polyester polyols and aliphatic isocyanates, aliphatic polyurethanes based on polyethers, and polyurethanes based on polyesters and aliphatic isocyanates.

6. The two-part combination of compositions of claim 1, wherein:
the polyurethane dispersion further comprises 5-chloro-2-methyl-3(2H)-isothiazolone and 2-methyl-3(2H)-isothiazolone.

7. The two-part combination of compositions of claim 1, wherein:
the epoxy-ester resin and/or the flexible epoxy resin, and the polyurethane are included in the binder composition in a weight ratio of about 5:1 to about 20:1, based on dry actives weight.

8. The two-part combination of compositions of claim 1, wherein:
the size composition comprises one or more coupling agents; and the size composition optionally comprises a member selected from the group consisting of pH adjusters, antioxidants, antifoaming agents, lubricants and antistatic agents.

9. The two-part combination of compositions of claim 8, wherein:
the size composition further comprises a cationic softener and a wetting agent.

10. The two-part combination of compositions of claim 9, wherein:
the one or more coupling agents and the cationic softener are included in the size composition in a weight ratio of about 1:1 to about 30:1, based on dry actives weight; and
the one or more coupling agents and the wetting agent are included in the size composition in a weight ratio of about 4:1 to about 60:1, based on dry actives weight.

11. The two-part combination of compositions of claim 9, wherein:
at least one of the one or more coupling agents of the size composition is a silane coupling agent having one or more functional groups selected from the group consisting of amino, epoxy, ester, vinyl, alkyl, methacryloxy, ureido, isocyanato, siloxane, amine, imino, amido, imido, and azamido.

12. The two-part combination of compositions of claim 11, wherein:
at least one of the one or more coupling agents of the size composition is amino propyl triethoxy silane.

13. The two-part combination of compositions of claim 9, wherein:
the cationic softener of the size composition is selected from the group consisting of imidazo line, alkyl imidazoline derivatives, amino ethyl imidazolines, and acetic acid salts of the reaction products of amines and fatty acids.

14. The two-part combination of compositions of claim 13, wherein:
the cationic softener of the size composition is selected from the group consisting of amino ethyl imidazo lines and an acetic acid salt of the reaction product of tetraethylene pentamine and stearic acid.

15. The two-part combination of compositions of claim 9, wherein:
the wetting agent of the size composition is a non-ionic wetting agent.

16. The two-part combination of compositions of claim 15, wherein:
the wetting agent of the size composition is a fluoroalkyl alcohol substituted polyethylene glycol.

17. The two-part combination of compositions of claim 8, wherein:
at least one of the one or more coupling agents of the size composition is a silane coupling agent having one or more functional groups selected from the group consisting of amino, epoxy, ester, vinyl, alkyl, methacryloxy, ureido, isocyanato, siloxane, amine, imino, amido, imido, and azamido.

18. The two-part combination of compositions of claim 17, wherein:
at least one of the one or more coupling agents of the size composition is amino propyl triethoxy silane.

19. A two-part combination of compositions for forming a substantially colorless reinforced fiber material comprising:
a size composition; and
a binder composition, said binder composition being essentially free of aminosilane coupling agents and comprising both a non-ionic aqueous emulsion of an epoxy-ester resin and a non-ionic aqueous emulsion of a flexible epoxy resin; said binder composition further comprises an aqueous polyurethane dispersion;
said size composition and said binder composition being chemically distinct from one another; wherein said size composition is applied as a first layer on a glass fiber, forming a sized glass fiber; and said binder composition is applied to said sized glass fiber, forming a substantially colorless reinforced fiber material.

20. The two-part combination of compositions of claim 19, wherein:
the non-ionic aqueous emulsion of an epoxy-ester resin includes bisphenol A based epoxy resins.

21. The two-part combination of compositions of claim 19, wherein:
the binder composition comprises a mixture of 1-methoxy-2-propanol bisphenol A epoxy resin having a Mn of less than about 700 and 1-methoxy-2-propanol epoxy resin having a Mn of about 3200.

22. The two-part combination of compositions of claim 19, wherein:
the epoxy-ester resin and the flexible epoxy resin selected from the group consisting of non-ionic multifunctional epoxy resins, non-ionic bisphenol A novolac type epoxy resins, non-ionic phenol novolac epoxy resins; non-ionic epoxy-esters; low molecular weight liquid bisphenol A epoxy resin, semi-solid bisphenol A epoxy resins, butadiene-acrylonitrile modified epoxy resins, semi-solid bisphenol A epoxy resins with an organic co-solvent, solid bisphenol A epoxy resins, solid bisphenol A epoxy resin with an organic co-solvent, solid bisphenol A epoxy resins with a non HAPS co-solvent, epoxidized bisphenol A novolac resins; urethane-modified bisphenol A epoxy resins, and epoxidized o-cresylic novolac resins.

23. The two-part combination of compositions of claim 19, wherein:
the polyurethane dispersion is formed with a polyurethane selected from the group consisting of non-ionic polyurethanes based on polyester polyols and aliphatic isocyanates, aliphatic polyurethanes based on polyethers, and polyurethanes based on polyesters and aliphatic isocyanates.

24. The two-part combination of compositions of claim 19, wherein:
the polyurethane dispersion further comprises 5-chloro-2-methyl-3(2H)-isothiazolone and 2-methyl-3(2H)-isothiazolone.

25. The two-part combination of compositions of claim 19, wherein:
the epoxy-ester resin and/or the flexible epoxy resin, and the polyurethane are included in the binder composition in a weight ratio of about 5:1 to about 20:1, based on dry actives weight.

26. The two-part combination of compositions of claim 19, wherein:
the size composition comprises one or more coupling agents; and the size composition optionally comprises a member selected from the group consisting of pH adjusters, antioxidants, antifoaming agents, lubricants and antistatic agents.

27. The two-part combination of compositions of claim 26, wherein:
the size composition further comprises a cationic softener and a wetting agent.

28. The two-part combination of compositions of claim 27, wherein:
the one or more coupling agents and the cationic softener are included in the size composition in a weight ratio of about 1:1 to about 30:1, based on dry actives weight; and
the one or more coupling agents and the wetting agent are included in the size composition in a weight ratio of about 4:1 to about 60:1, based on dry actives weight.

29. The two-part combination of compositions of claim 27, wherein:
at least one of the one or more coupling agents of the size composition is a silane coupling agent having one or more functional groups selected from the group consisting of amino, epoxy, ester, vinyl, alkyl, methacryloxy, ureido, isocyanato, siloxane, amine, imino, amido, imido, and azamido.

30. The two-part combination of compositions of claim 29, wherein:
at least one of the one or more coupling agents of the size composition is amino propyl triethoxy silane.

31. The two-part combination of compositions of claim 27, wherein:
the cationic softener of the size composition is selected from the group consisting of imidazoline, alkyl imidazoline derivatives, amino ethyl imidazolines, and acetic acid salts of the reaction products of amines and fatty acids.

32. The two-part combination of compositions of claim 31, wherein:
the cationic softener of the size composition is selected from the group consisting of amino ethyl imidazolines and an acetic acid salt of the reaction product of tetraethylene pentamine and stearic acid.

33. The two-part combination of compositions of claim 27, wherein:
the wetting agent of the size composition is a non-ionic wetting agent.

34. The two-part combination of compositions of claim 33, wherein:
the wetting agent of the size composition is a fluoroalkyl alcohol substituted polyethylene glycol.

35. The two-part combination of compositions of claim 26, wherein:
at least one of the one or more coupling agents of the size composition is a silane coupling agent having one or more functional groups selected from the group consisting of amino, epoxy, ester, vinyl, alkyl, methacryloxy, ureido, isocyanato, siloxane, amine, imino, amido, imido, and azamido.

36. The two-part combination of compositions of claim 35, wherein:
at least one of the one or more coupling agents of the size composition is amino propyl triethoxy silane.

* * * * *